(12) United States Patent
Chen et al.

(10) Patent No.: US 11,962,807 B2
(45) Date of Patent: Apr. 16, 2024

(54) ENTROPY CODING FOR VIDEO ENCODING AND DECODING

(71) Applicant: InterDigital VC Holdings, Inc., Wilmington, DE (US)

(72) Inventors: Ya Chen, Rennes (FR); Fabrice Leleannec, Mouazé (FR); Tangi Poirier, Thorigné-Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 16 days.

(21) Appl. No.: 17/431,819

(22) PCT Filed: Mar. 5, 2020

(86) PCT No.: PCT/US2020/021150
§ 371 (c)(1),
(2) Date: Aug. 18, 2021

(87) PCT Pub. No.: WO2020/185500
PCT Pub. Date: Sep. 17, 2020

(65) Prior Publication Data
US 2022/0116662 A1 Apr. 14, 2022

(30) Foreign Application Priority Data
Mar. 11, 2019 (EP) .................................... 19305279

(51) Int. Cl.
*H04N 19/70* (2014.01)
*H04N 9/46* (1968.09)
(Continued)

(52) U.S. Cl.
CPC ............. *H04N 19/70* (2014.11); *H04N 19/13* (2014.11); *H04N 19/176* (2014.11); *H04N 19/46* (2014.11)

(58) Field of Classification Search
None
See application file for complete search history.

(56) References Cited

U.S. PATENT DOCUMENTS 6,907,075 B2  6/2005  Felts et al.
9,357,185 B2  5/2016  Guo et al.
(Continued)

FOREIGN PATENT DOCUMENTS

CN    1411665 A       4/2003
CN    103202016 A     7/2013
WO    2019/050385 A2  3/2019

OTHER PUBLICATIONS

Bross et al., "Versatile Video Coding (Draft 4)," Joint Video Experts Team (JVET) of ITU-T SG 16 WP 3 and ISO/IEC JTC 1/SC 29/WG 11, 13th Meeting: Marrakech, Morocco, Jan. 9-18, 2019, Document: JVET-M1001-v6, pp. 1-285. (Year: 2019).*

(Continued)

*Primary Examiner* — Reza Aghevli
(74) *Attorney, Agent, or Firm* — CONDO ROCCIA KOPTIW LLP

(57) ABSTRACT

Encoding or decoding syntax information associated with video information can involve identifying a coding context associated with a syntax element of a current coding unit of (Continued)

the video information, wherein the identifying occurs without using a syntax element of a neighboring block, and encoding or decoding the syntax element of the current coding unit based on the coding context.

20 Claims, 15 Drawing Sheets

(51) Int. Cl.
  *H04N 19/13* (2014.01)
  *H04N 19/176* (2014.01)
  *H04N 19/46* (2014.01)

(56) References Cited

U.S. PATENT DOCUMENTS

| | | | |
|---|---|---|---|
| 9,565,435 | B2 | 2/2017 | Fang et al. |
| 9,973,759 | B2 | 5/2018 | Zhang et al. |
| 10,187,661 | B2 | 1/2019 | Guo et al. |
| 10,327,008 | B2 | 6/2019 | Chien et al. |
| 11,082,721 | B2 | 8/2021 | Lee |
| 2016/0337649 | A1* | 11/2016 | Chuang ............... H04N 19/159 |
| 2017/0188031 | A1 | 6/2017 | Lee et al. |
| 2017/0214939 | A1* | 7/2017 | Lee ..................... H04N 19/70 |
| 2020/0213612 | A1* | 7/2020 | Liu ..................... H04N 19/147 |
| 2020/0260070 | A1* | 8/2020 | Yoo .................... H04N 19/176 |
| 2022/0030268 | A1* | 1/2022 | Leleannec ............ H04N 19/176 |
| 2022/0078488 | A1* | 3/2022 | Leleannec ............ H04N 19/105 |
| 2022/0109877 | A1* | 4/2022 | Choi .................... H04N 19/176 |

OTHER PUBLICATIONS

Bross et al., "Versatile Video Coding (Draft 4)", 13. JVET Meeting; Jan. 9, 2019-Jan. 18, 2019; Marrakech; (The Joint Exploration Video Team of ISO/IEC JTC1/SC29/WG11 and ITU-T SG.16), No. JVET-M1001, Mar. 9, 2019.

Sasai, Hisao (Panasonic), et al.,: "Modified Context Derivation for Complexity reduction"; Joint Collaborative Team on Video Coding (JCT-VC) of ITU-T SG16 WP3 and ISO/IEC JTC1/SC29/WG11, 6th Meeting: Torino, IT, Jul. 14-22, 2011; Document: JCTVC-F429; 8 pages.

Sze, Vivienne, et al.,: "High Throughput CABAC Entropy Coding in HEVC", IEEE Transactions on Circuits and Systems for Video Technology, vol. 22, No. 12, Dec. 2012, pp. 1778-1791, 14 pages.

Anonymous, Series H: Audiovisual and Multimedia Systems—infrastructure of audiovisual services—Coding of moving video: High Efficiency Video Coding, International Telecommunication Union, Recommendation ITU-T H.265, Oct. 2014, 540 pages.

Chen et al., "Algorithm description for Versatile Video Coding and Test Model 1 (VTM 1)", JVET-J1002-v2, Editors, JVET of ITU-T SG 16 WP 3 and ISO/IEC JTC 1/SC 29/WG 11, 10th Meeting: San Diego, US, Apr. 10-20, 2018, 10 pages.

Chen et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

* cited by examiner

ENTROPY CODING FOR VIDEO ENCODING AND DECODING

CROSS-REFERENCE TO RELATED APPLICATIONS

This application is the National Stage Entry under 35 U.S.C. § 371 of Patent Cooperation Treaty Application No. PCT/US2020/021150, filed Mar. 5, 2020, which claims priority from European Patent Application No. 19305279.2, filed Mar. 11, 2019, the disclosures of each of which are incorporated by reference herein in their entireties.

TECHNICAL FIELD

The present disclosure involves video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. To reconstruct the video, the compressed data is decoded by inverse processes corresponding to the prediction, transform, quantization and entropy coding.

SUMMARY

In general, an aspect of the present disclosure involves providing various approaches or modifications to entropy coding.

At least one example of an embodiment is provided involving in an encoder and/or decoder for applying a form of entropy coding based on information provided by at least one syntax element, and deriving a number of contexts for the at least one syntax element, wherein the deriving comprises reducing the number of contexts.

At least one other example of an embodiment is provided involving a method for encoding syntax information associated with video information comprising: identifying a coding context associated with a syntax element of a current coding unit of the video information, wherein the identifying occurs without using a syntax element of a neighboring block; and encoding the syntax element of the current coding unit based on the coding context.

At least one other example of an embodiment is provided involving a method for decoding syntax information associated with video information comprising: identifying a coding context associated with a syntax element of a current coding unit of the video information, wherein the identifying occurs without using a syntax element of a neighboring block; and decoding the syntax element of the current coding unit based on the coding context.

At least one other example of an embodiment is provided involving apparatus for encoding syntax information associated with video information comprising: one or more processors configured to identify a coding context associated with a syntax element of a current coding unit without using a syntax element of a neighboring block; and encode the syntax element of the current coding unit based on the coding context.

At least one other example of an embodiment is provided involving apparatus for decoding syntax information associated with video information comprising: one or more processors configured to identify a coding context associated with a syntax element of a current coding unit without using a syntax element of a neighboring block; and decode the syntax element of the current coding unit based on the coding context.

At least one other example of an embodiment can involve one or more of: a syntax element comprising an adaptive motion vector resolution (AMVR) flag, or a form of entropy coding comprising context adaptive binary arithmetic coding (CABAC), or reducing the number of contexts of one or more syntax elements using left and above neighboring syntax elements, or reducing the number of contexts of one or more syntax elements based on sharing a context for a plurality of different bin indexes of the same block size, or sharing a context index set for different block sizes, e.g., when signaling coordinates of the last significant coefficient.

Various modifications and embodiments are envisioned as explained below that can provide improvements to a video encoding and/or decoding system including but not limited to one or both of increased compression or coding efficiency and decreased complexity.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by considering the detailed description below in conjunction with the accompanying figures, in which.

It should be understood that the drawings are for purposes of illustrating examples of various aspects and embodiments and are not necessarily the only possible configurations. Throughout the various figures, like reference designators refer to the same or similar features.

DETAILED DESCRIPTION

Figure 1:
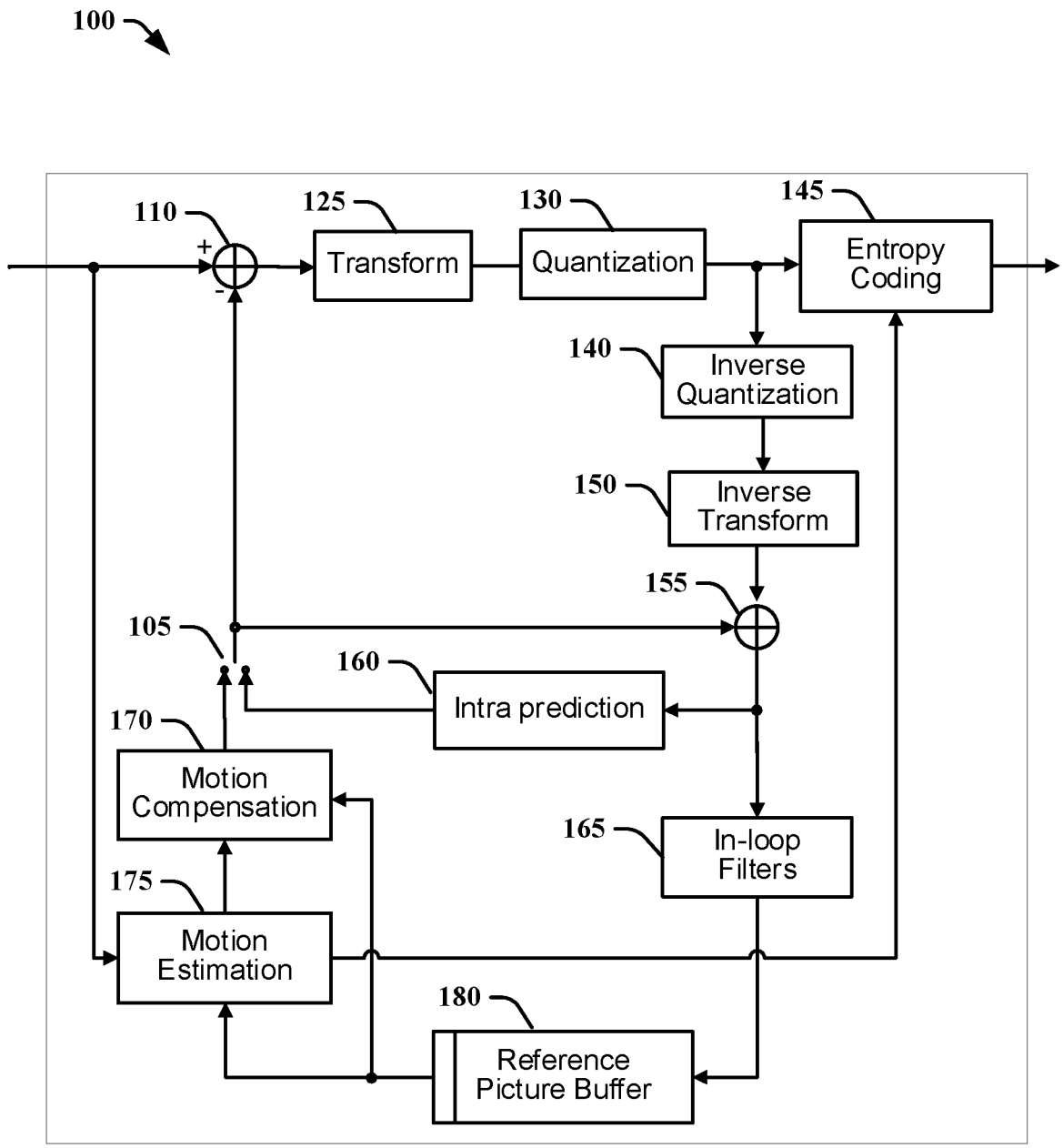
FIG. 1 provides a block diagram depicting an example of an embodiment of a video encoder.

Turning now to the figures, FIG. 1 illustrates an example of a video encoder 100, such as an HEVC encoder. HEVC is a compression standard developed by *Joint Collaborative Team on Video Coding (JCT-VC)* (see, e.g., "ITU-T H.265 TELECOMMUNICATION STANDARDIZATION SECTOR OF ITU (10/2014), SERIES H: AUDIOVISUAL AND MULTIMEDIA SYSTEMS, Infrastructure of audiovisual services—Coding of moving video, High efficiency video coding, Recommendation ITU-T H.265"). FIG. 1 may also illustrate an encoder in which improvements are made to the HEVC standard or an encoder employing technologies similar to HEVC, such as an encoder based on or improved upon JEM (Joint Exploration Model) under development by the Joint Video Experts Team (JVET), e.g., that associated with the development effort designated Versatile Video Coding (VVC).

In the present application, the terms "reconstructed" and "decoded" may be used interchangeably, the terms "pixel" and "sample" may be used interchangeably, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In encoder 100 in FIG. 1, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
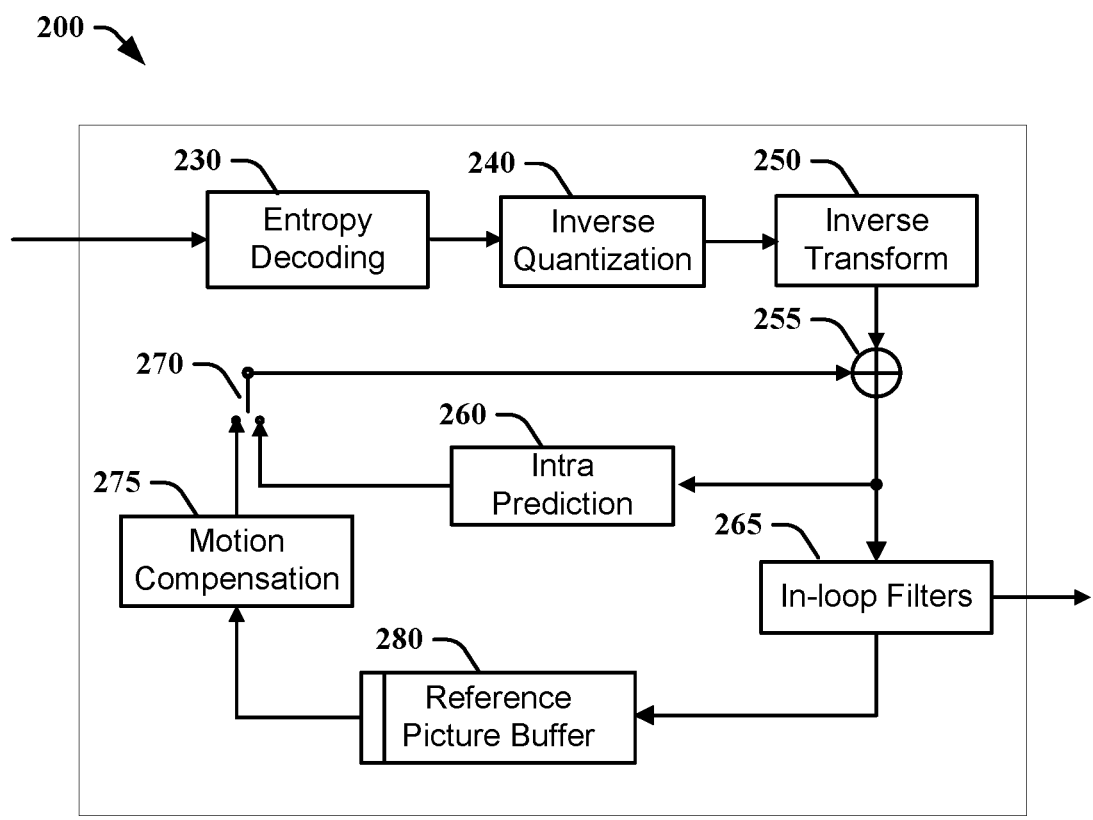
FIG. 2 provides a block diagram depicting an example of an embodiment of a video decoder.

FIG. 2 illustrates a block diagram of an example of a video decoder 200, such as an HEVC decoder. In the example decoder 200, a signal or bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a decoder based on or improved upon JEM.

In particular, the input of the decoder includes a video signal or bitstream that can be generated by a video encoder such as video encoder 100 of FIG. 1. The signal or bitstream is first entropy decoded (230) to obtain transform coefficients, motion vectors, and other coded information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). Advanced Motion Vector Prediction (AMVP) and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

Figure 3:
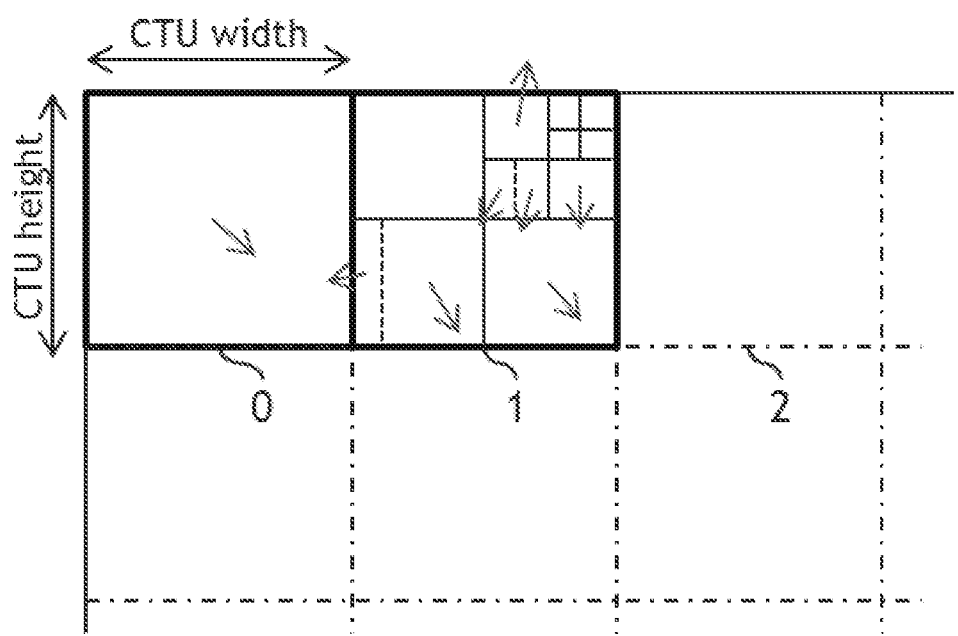
FIG. 3 illustrates a Coding Tree Unit (CTU) and Coding Tree concepts that can be used to represent a compressed picture.

In the HEVC video compression standard, motion compensated temporal prediction is employed to exploit the redundancy that exists between successive pictures of a video. To do so, a motion vector is associated to each prediction unit (PU). Each Coding Tree Unit (CTU) is represented by a Coding Tree (CT) in the compressed domain. This is a quad-tree division of the CTU, where each leaf is called a Coding Unit (CU) as illustrated in FIG. 3.

Figure 4:
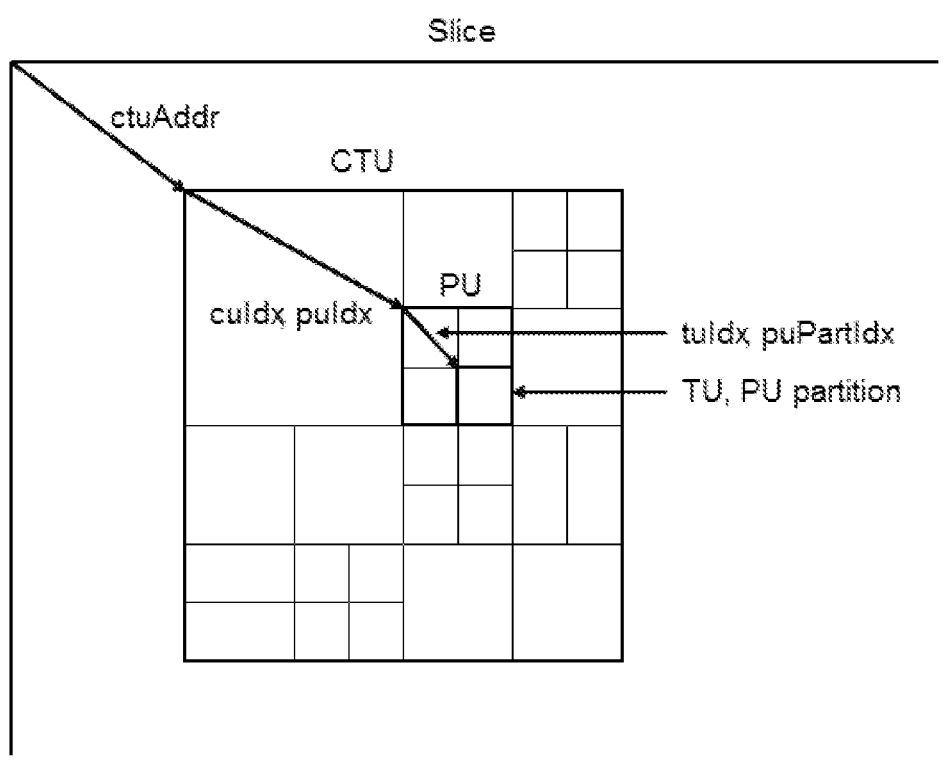
FIG. 4 illustrates a Coding Tree Unit (CTU) and division of a CTU into Coding Units (CU), Prediction Units (PU) and Transform Units (TU)

Each CU is then given some Intra or Inter prediction parameters or prediction information (Prediction Info). To do so, it is spatially partitioned into one or more Prediction Units (PUs), each PU being assigned some prediction information. The Intra or Inter coding mode is assigned on the CU level as illustrated in FIG. 4 which shows an example of division of a Coding Tree Unit into Coding Units, Prediction Units and Transform Units. For coding a CU, a prediction block or prediction unit (PU) is built from neighboring reconstructed samples (intra prediction) or from previously reconstructed pictures stored in the Decoded Pictures Buffer (DPB) (inter-prediction). Next, the residual samples calculated as the difference between original samples and PU samples, are transformed and quantized.

Figure 5:
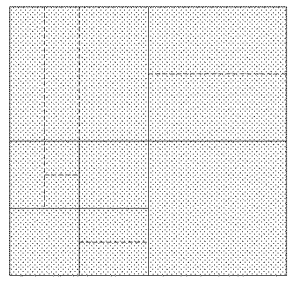
FIG. 5 illustrates an example of Quad-Tree plus Binary-Tree (QTBT) representation.
Figure 5:
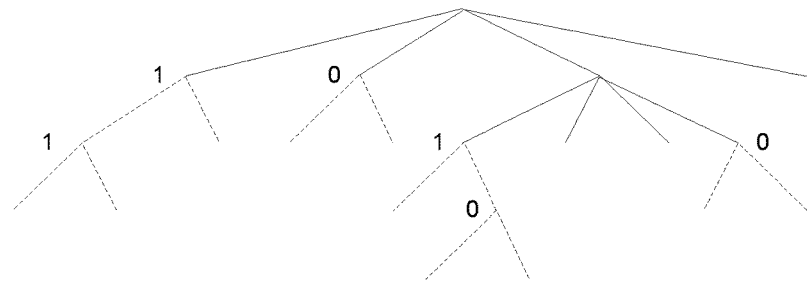

Codecs and video compression tools other than HEVC, e.g. the Joint Exploration Model (JEM) and that developed by JVET (Joint Video Exploration Team) group in the Versatile Video Coding (VVC) reference software known as VVC Test Model (VTM), may provide for a CTU representation in the compressed domain that represents picture data in a more flexible way in the compressed domain. A more flexible representation of the coding tree can provide increased compression efficiency compared to an approach such as the CU/PU/TU arrangement of the HEVC standard. One example of a more flexible representation is a Quad-Tree plus Binary-Tree (QTBT) coding tool. An example of a representation such as QTBT is illustrated in FIG. 5 which shows a coding tree having coding units that can be split both in a quad-tree and in a binary-tree fashion. The splitting of a coding unit can be decided on the encoder side based on an optimization procedure, e.g., a rate distortion optimization procedure, that determines the QTBT representation of the CTU with minimal rate distortion cost.

In the QTBT technology, a CU can have either square or rectangular shape. The size of a coding unit may be a power of 2 and, for example, have a range from 4 to 128. In addition to this variety of rectangular shapes for a coding unit, a representation of a CTU such as QTBT can have the following characteristics that differ from an approach such as HEVC:

The QTBT decomposition of a CTU is made of two stages: first the CTU is split in a quad-tree fashion, then each quad-tree leaf can be further divided in a binary fashion. This is illustrated on the right side of FIG. 5 where solid lines represent the quad-tree decomposition phase and dashed lines represent the binary decomposition that is spatially embedded in the quad-tree leaves.

In intra slices, the Luma and Chroma block partitioning structure is separated, and decided independently.

CU partitioning into prediction units or transform units is not employed, i.e., each CU is systematically made of a single prediction unit (2N×2N prediction unit partition type) and single transform unit (no division into a transform tree).

Figure 6:
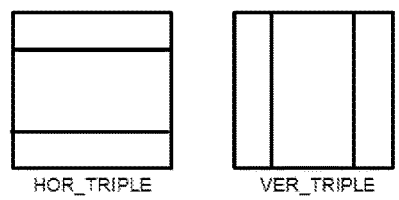
FIG. 6 illustrates examples of Triple-Tree splitting modes for a Coding Unit (CU) including a horizontal splitting mode (left side of FIG. 6) and a vertical splitting mode (right side of FIG. 6)
Figure 7:
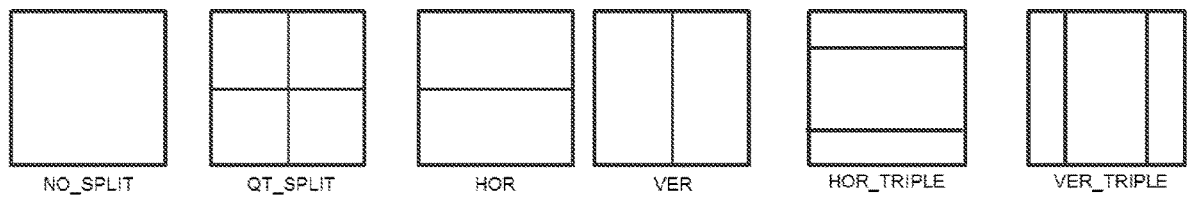
FIG. 7 illustrates examples of various CU splitting modes.

Certain systems may use one or more various other CU split modes. For example, the VVC (Versatile Video Coding) video compression standard provides for horizontal or vertical triple tree splitting modes as illustrated in FIG. 6. As shown in FIG. 6, triple tree splitting can involve dividing a CU into three sub-coding-units (sub-CUs), with respective sizes equal to ¼, ½ and ¼ of the parent CU size in the direction of the considered spatial division. Various other splitting modes are illustrated in FIG. 7.

After the splitting, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

In general, an aspect of the present disclosure can involve one or more of entropy coding of transform coefficients, inter prediction flags and partitioning flags. In at least one embodiment, the complexity of signaling and parsing of at least some syntax elements associated with entropy coding can be reduced. For example, in at least one embodiment, reducing the complexity can involve reducing the number of operations in the decoder process and/or the number of contexts used for a form of entropy coding such as context-based adaptive binary arithmetic coding (CABAC).

Figure 8:
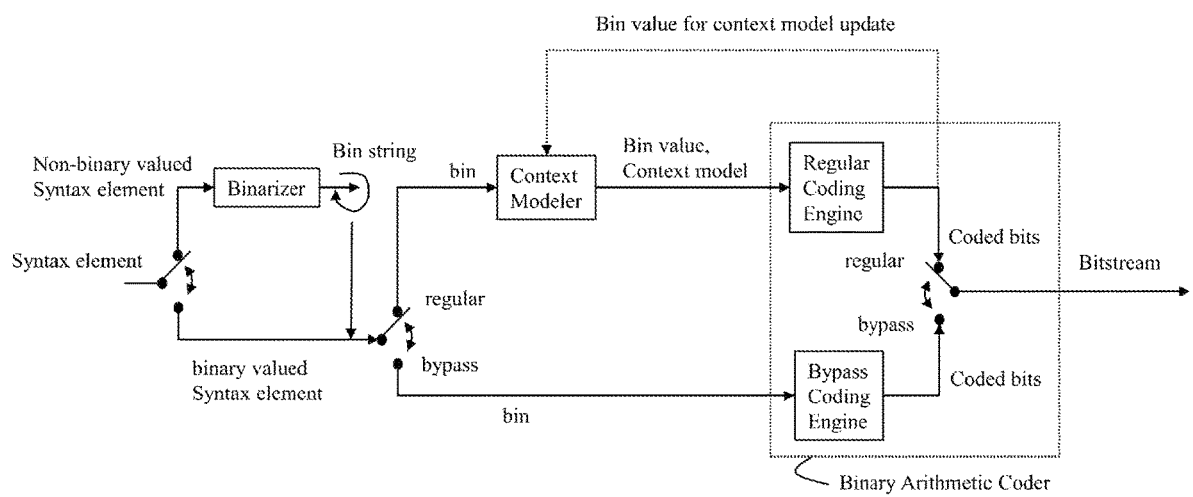
FIG. 8 provides a flow diagram illustrating an example of a CABAC coding process: from a syntax element to its binarized value, to the context-based arithmetic coding of some of its bins, and the bypass coding of some other of its bins.

CABAC can be used to encode syntax elements into the bitstream. To encode with CABAC, a non-binary syntax element value is mapped to a binary sequence, called a bin string. For a bin, a context model is selected. The context model stores the probability of each bin being '1' or '0' and can be adaptive or static. The static model triggers a coding engine with an equal probability for bins '0' and '1'. In the adaptive coding engine, the context model is updated based on the actual coded value of a bin. The operation modes corresponding to the adaptive and static models are called the regular mode and the bypass mode, respectively as shown in FIG. 8.

For regular mode, a context is obtained for the decoding of a current bin. The context is given by the context modeler as shown in FIG. 8. The goal of the context is to obtain the conditional probability that the current bin has value '0', given some contextual prior information X. The prior X can be a value of some already decoded syntax element, available both on the encoder and decoder side in a synchronous way, at the time the current bin is being decoded.

Typically, the prior X used for the decoding of a bin is specified in the standard and is chosen because it is statistically correlated with the current bin to decode. The interest of using this contextual information is that it reduces the rate cost of coding the bin. This is based on the fact that the conditional entropy of the bin given X is lower because the bin and X are correlated. The following relationship is well-known in information theory:

$$H(\text{bin}|X) < H(\text{bin})$$

It means that the conditional entropy of bin knowing X is lower than the entropy of bin if bin and X are statistically correlated. The contextual information X is thus used to obtain the probability of bin being '0' or '1'. Given these conditional probabilities, the regular decoding engine of FIG. 8 performs the arithmetic decoding of the binary value bin. The value of bin is then used to update the value of the conditional probabilities associated to current bin, knowing the current contextual information X. This is called the context model updating step in FIG. 8. Updating the context model for each bin as long as the bins are being decoded (or coded), allows progressively refining the context modeling for each binary element. Thus, the CABAC decoder progressively learns the statistical behavior of each regular-encoded bin.

Note that the context modeler and the context model updating steps are identical operations on the encoder and on the decoder sides. This provides the reciprocal of the binarization step that was done by the encoder. The inverse conversion performed here thus comprises obtaining the value of these syntax elements based on their respective decoded binarized versions.

A plurality of contexts can be used for signaling one syntax element. For example, in a system such as that proposed for VVC (e.g., VTM-4) there are 387 contexts used for 12 syntax elements which means approximately 32 contexts per syntax. As mentioned, the CABAC decoder needs to accumulate an amount of statistical data to thereby learn the statistical behavior of each regular-encoded bin progressively. When there are many contexts for one coding bin, the statistics of each context might not be enough for the convergence and stability of the context model, which might impact the efficiency of the CABAC decoder.

In general, at least one embodiment can involve reducing a number of CABAC contexts for regular (or context-based) coded bins (transform coefficient, intra and inter prediction flags, adaptive loop filter flag and partitioning flags, etc.). As a result, the complexity of the decoding process can be reduced. For example, in at least one embodiment, complexity can be reduced in regard to 48 contexts associated with both last x and last y coordinates (syntax element last_sig_coeff_x_prefix and last_sig_coeff_y_prefix), 3 contexts for one of the intra prediction flags (syntax element pred_mode_ibc_flag), 18 contexts for some of the inter prediction flags (syntax element cu_skip_flag, inter_affine_flag, amvr_flag and merge_triangle_flag), 9 contexts for adaptive loop filter flag (syntax element alf_ctb_flag), and 15 contexts for the some partitioning flags (syntax element split_cu_flag and qt_split_cu_flag). In general, at least one example of an embodiment can involve reducing the complexity of a context derivation process for entropy coding, e.g., CABAC, based on reducing the number of contexts for some syntax elements using left and above neighboring syntax elements. In general, at least one example of an embodiment can involve sharing the same context, e.g., CABAC context, for more different bin indexes of the same block size or share the same context index set for different block sizes when signaling the coordinates of the last significant coefficient.

Figure 9:
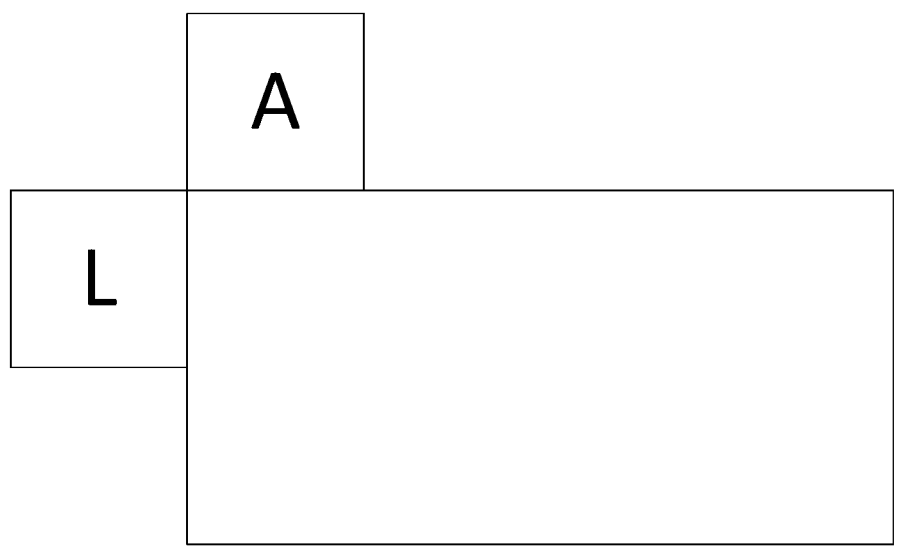
FIG. 9 illustrates an example of neighboring blocks used in at least one embodiment of context model derivation, e.g., for inter_affine_flag.

In more detail, an approach to a context derivation process for entropy coding will be described, based on an example such as CABAC, that can involve using the neighboring syntax elements for various syntax elements. Then, various examples of embodiments for reducing the complexity of the context derivation for these syntax elements will be described. Next, an approach to context selection for a last significant coefficient in an example embodiment will be described for an example of entropy coding such as CABAC. Then, an example of an embodiment for reducing be signaled into the bitstream to the decoder. For an example of entropy coding such as CABAC, some flags are coded with several contexts which are derived with using the neighboring syntax element. For example, one flag namely inter_affine_flag can be signaled to indicate whether the affine model based motion compensation is used to generate the prediction samples of the current CU or not. For the example of an approach to entropy coding based on CABAC, the inter_affine_flag is CABAC coded with 3 context models and the context model is derived with the sum of the inter_affine_flag of the left block L and above block A as depicted in FIG. 9. And the CABAC context ctxInc derivation process can be formulated as follows:

ctxInc=($L$ is available && $L$ is affine)+($A$ is available && $A$ is affine)

Figure 10:
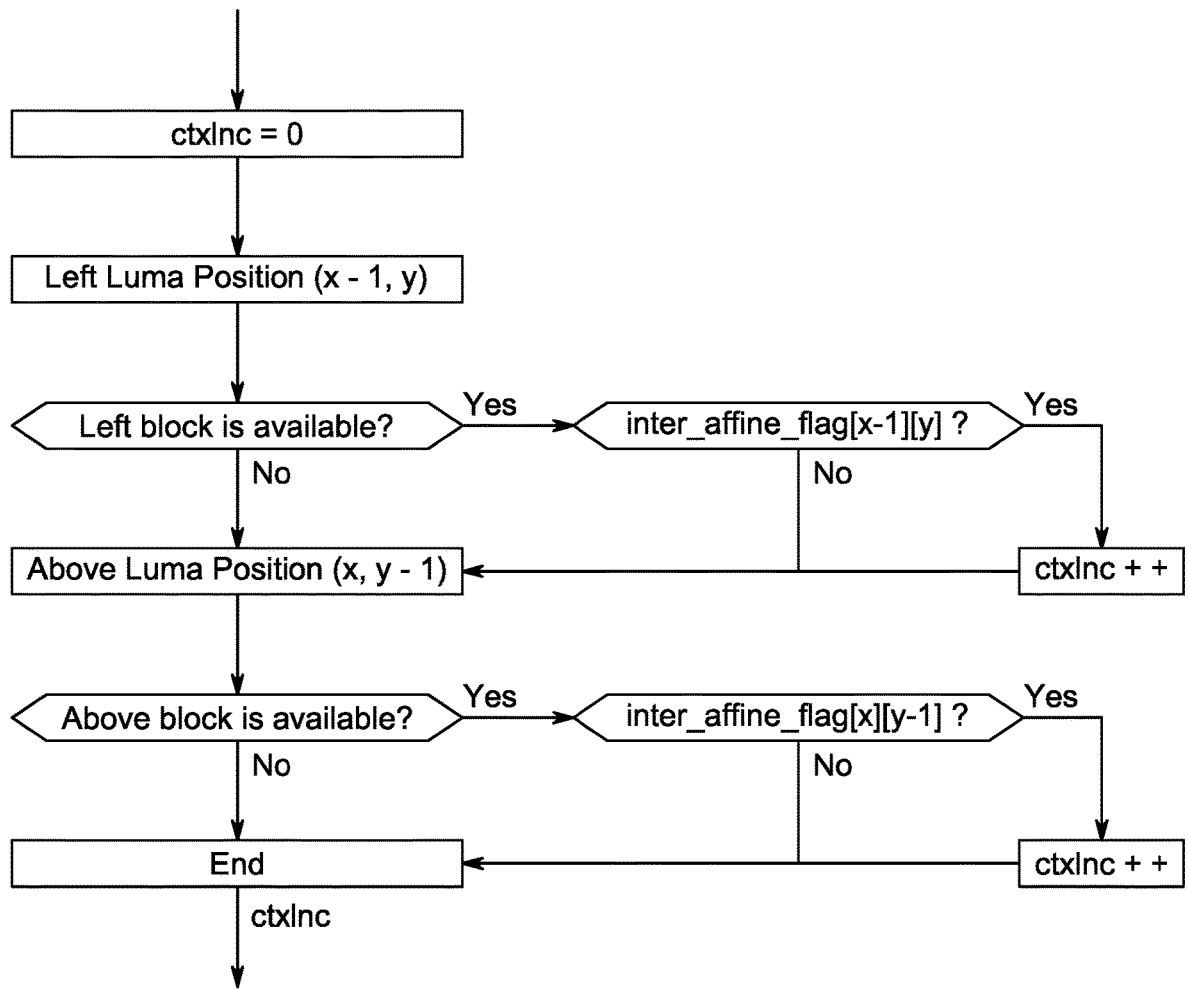
FIG. 10 through FIG. 14 and FIG. 16 provide flow diagrams illustrating various examples of embodiments in accordance with one or more aspects of the present disclosure.

An example of an embodiment providing the context model ctxInc derivation for inter_affine_flag is illustrated by the flow diagram shown in FIG. 10. A similar process can also be applied for deriving CABAC context for the syntax elements for the skip mode (cu_skip_flag), AMVR mode (amvr_flag), triangular prediction mode (merge_triangle_flag), current picture referencing mode (pred_mode_ibc_flag), adaptive loop filter (alf_ctb_flag) and partitioning (split_cu_flag and qt_split_cu_flag).

In at least one example of an embodiment, an input to the described CABAC derivation process can be the luma location (x0, y0) specifying the top-left luma sample of the current luma block relative to the top-left sample of the current picture, may be also the color component cIdx, the current coding quadtree depth cqDepth, and the width and the height of the current coding block in luma samples cbWidth and cbHeight. An output of the described process is ctxInc.

Other parameters or variables can include:
location of the block to the left (xNbL, yNbL) that can be set equal to (x0−1, y0),
availableL specifying the availability of the block located directly to the left of the current block,
location of the block above (xNbA, yNbA) that can be set equal to (x0, y0−1), and
availableA specifying the availability of the coding block located directly above the current block.

For the example of CABAC, the assignment of ctxInc can be determined as follows with condL and condA as specified in Table 1 below:

ctxInc=(cond$L$ && available$L$)+(cond$A$ && available$A$)+ctxSetIdx*3.

TABLE 1 specification of CABAC context using left and above syntax elements

| Syntax element | condL | condA | ctxSetIdx | ctxInc number |
|---|---|---|---|---|
| alf_ctb_flag[ x0 ][ y0 ][ cIdx ] | alf_ctb_flag[ xNbL ][ yNbL ][ cIdx ] | alf_ctb_flag[ xNbA ][ yNbA ][cIdx ] | cIdx | 9 |
| split_cu_flag | cbHeight[ xNbL ][ yNbL ] < cbHeight | cbHeight[ xNbA ][ yNbA ] < cbWidth | 3 | 9 |
| qt_split_cu_flag | cqtDepth[ xNbL ][ yNbL ] > cqtDepth | cqtDepth[ xNbA ][ yNbA ] > cqtDepth | (cqtDepth < 2) ? 0:1 | 6 |
| cu_skip_flag[ x0 ][ y0 ] | cu_skip_flag[ xNbL ][ yNbL ] | cu_skip_flag[ xNbA ][ yNbA ] | 0 | 3 |
| pred_mode_ibc_flag[ x0 ][ y0 ] | pred_mode_ibc_flag [ xNbL ][ yNbL ] | pred_mode_ibc_flag [ xNbA ][ yNbA ] | 0 | 3 |
| amvr_flag[ x0 ][ y0 ] | amvr_flag[ xNbL ][ yNbL ] | amvr_flag[ xNbA ][ yNbA ] | 0 | 6 |
| merge_triangle_flag[ x0 ][ y0 ] | merge_triangle_flag[ xNbL ][ yNbL ] | merge_triangle_flag [ xNbA ][ yNbA ] | 0 | 3 |
| inter_affine_flag [ x0 ][ y0 ] | inter_affine_flag[ xNbL ][ yNbL ] | inter_affine_flag[ xNbA ][ yNbA ] | 0 | 3 | the complexity of the context of the last significant coefficient coordinates signaling will be described.

In one or more examples of systems, to indicate whether some prediction tools or modes are used or not, one flag can In at least one example of an embodiment, complexity of the described context derivation process for the syntax elements mentioned above can be reduced by deriving only two context models based on left and above syntax elements.

As described above, inter_affine_flag for the example of CABAC can be coded with three context models and the context model is derived with the sum of the inter_affine_flag of the left block L and above block A.

However, instead of using the neighboring blocks information to generate three context models, only two context models can be derived to reduce the redundant contexts. In a first example of an embodiment, the context model can be derived using the OR value of the inter_affine_flag of the left block L and above block A, which indicates the context for the syntax element will be set to 1 if either the condition of the left block L (condL) or the condition of the above block A (condA) is true. The corresponding ctxInc assignment formation is specified as below:

ctxInc=(condL && availableL)||(condA && availableA)+ctxSetIdx*2.

In a second example of an embodiment, the context model can be derived using the AND value of the inter_affine_flag of the left block L and above block A, which indicates the context for the syntax element will be set to 1 only when both conditions condL and condA are true. The corresponding ctxInc assignment formation is specified as below:

ctxInc=(condL && availableL)&&(condA && availableA)+ctxSetIdx*2.

Figure 11:
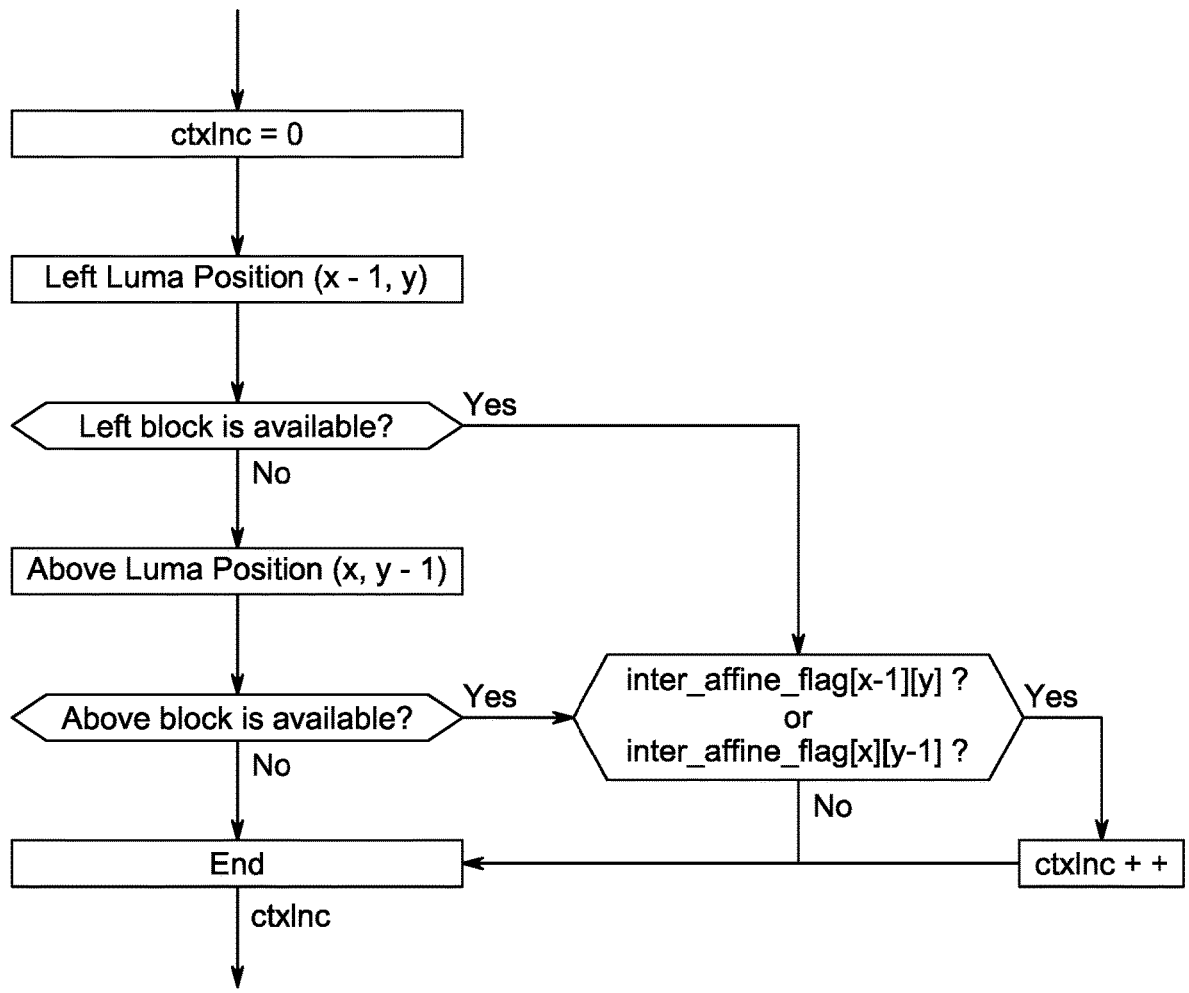

As an example, the context model ctxInc derivation process for inter_affine_flag based on the described first example embodiment is illustrated by the flow diagram shown in FIG. 11. Applying the described approach to these syntax elements can reduce the number of ctxInc as shown in Table 2, i.e., produce 14 potential context reductions:

TABLE 2 reduced number of CABAC context using
left and above syntax elements

| Syntax element | ctxInc number |
|---|---|
| alf_ctb_flag[ x0 ][ y0 ][ cIdx ] | 9 → 6 |
| split_cu_flag | 9 → 6 |
| qt_split_cu_flag | 6 → 4 |
| cu_skip_flag[ x0 ][ y0 ] | 3 → 2 |
| pred_mode_ibc_flag[ x0 ][ y0 ] | 3 → 2 |
| amvr_flag[ x0 ][ y0 ] | 6 → 4 |
| merge_triangle_flag[ x0 ][ y0 ] | 3 → 2 |
| inter_affine_flag [ x0 ][ y0 ] | 3 → 2 |

Figure 16:
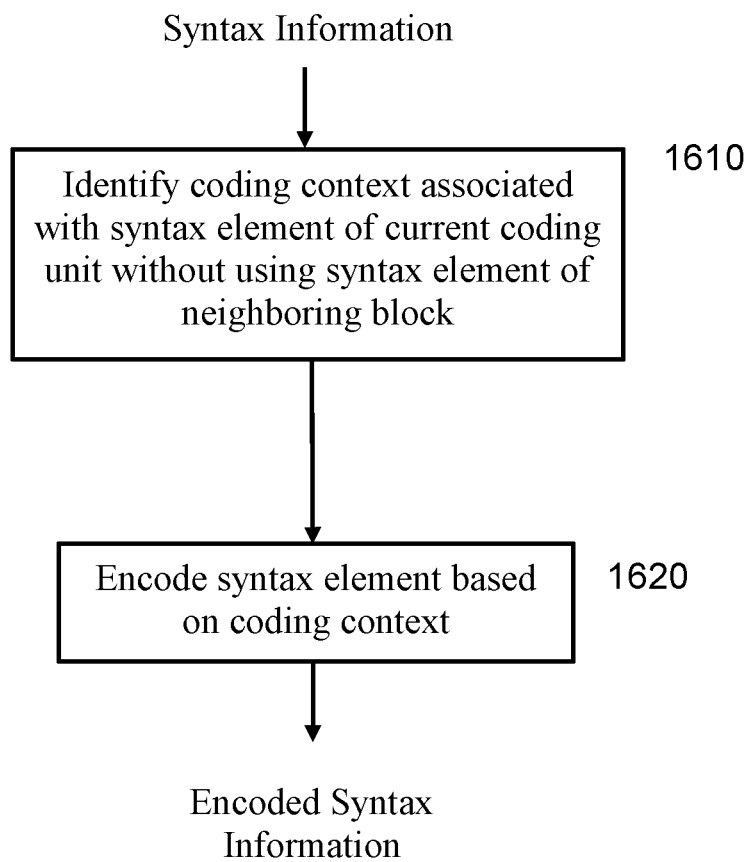

At least one other embodiment can provide for using only one context model for coding these syntax elements to avoid using the neighboring blocks. An example of the present embodiment is illustrated in FIG. 16. In FIG. 16, at 1610 a coding context associated with a syntax element of a current coding unit, e.g., amvr_flag, is identified or determined without using a syntax element of a neighboring block, e.g., without using an amvr_flag of a neighboring block. Then, at 1620, the syntax element is encoded based on the coding context. This embodiment of context derivation can reduce the line buffer size as well as the parsing complexity because the left and above syntax elements are not used in the context derivation process. Applying the described embodiment on these syntax elements can reduce the number of ctxInc as shown in Table 3, i.e., produce 28 potential context reductions:

TABLE 3 reduced number of CABAC context without
using left and above syntax elements

| Syntax element | ctxInc number |
|---|---|
| alf_ctb_flag[ x0 ][ y0 ][ cIdx ] | 9 → 3 |
| split_cu_flag | 9 → 3 |
| qt_split_cu_flag | 6 → 2 |
| cu_skip_flag[ x0 ][ y0 ] | 3 → 1 |
| pred_mode_ibc_flag[ x0 ][ y0 ] | 3 → 1 |
| amvr_flag[ x0 ][ y0 ] | 6 → 2 |
| merge_triangle_flag[ x0 ][ y0 ] | 3 → 1 |
| inter_affine_flag [ x0 ][ y0 ] | 3 → 1 |

At least one example of an embodiment based on CABAC can provide derivation of CABAC context for syntax elements last_sig_coeff_x_prefix and last_sig_coeff_y_prefix. One example of a system can include the position of the last significant coefficient in a block being coded by explicitly signaling its (X, Y) coordinates. Coordinate X indicates the column number and Y the row number. The coordinates are binarized in two parts, a prefix and a suffix. The first part represents an index to an interval (syntax elements last_sig_coeff_x_prefix and last_sig_coeff_y_prefix). This prefix has a truncated unary representation and the bins are coded in regular mode. The second part or suffix has a fixed length representation and is coded in bypass mode, which represents the offset within the interval. The maximum length of the truncated unary code (which is also the number of regular coded bins) for one coordinate is 3, 5, 7, 9 and 11, for block sizes of 4, 8, 16, 32, and 64 respectively. As an example, Table 4 shows the binarization for block width (height) equal to 64. The last significant coefficient coordinates x (y) are first mapped to 11 bins, and the corresponding bin is coded with regular mode.

TABLE 4 last position binarization of the prefix
part for block size equal to 64

| Coordinate (x or y) | last_sig_coeff_x_prefix (or last_sig_coeff_y_prefix) |
|---|---|
| 0 | 0 |
| 1 | 10 |
| 2 | 110 |
| 3 | 1110 |
| 4-5 | 11110 |
| 6-7 | 111110 |
| 8-11 | 1111110 |
| 12-15 | 11111110 |
| 16-23 | 111111110 |
| 24-31 | 1111111110 |
| 32-47 | 11111111110 |
| 48-63 | 11111111111 |

Different bins within the truncated unary part with similar statistics share contexts in order to reduce the total number of contexts. The number of contexts for the prefix of one coordinate is 24 (21 for luma and 3 for chroma), so the total number of contexts for last position coding is 48. Table 5 shows the context assignment for different bins for a given coordinate across all block sizes T, luma, and chroma components.

TABLE 5 last position context index for each truncated
unary code bin and the block size T

| Bin Index | 0 | 1 | 2 | 3 | 4 | 5 | 6 | 7 | 8 | 9 | 10 |
|---|---|---|---|---|---|---|---|---|---|---|---|
| T | | | | | Luma | | | | | | |
| 4 | 0 | 1 | 2 | | | | | | | | |
| 8 | 3 | 3 | 4 | 4 | 5 | | | | | | |
| 16 | 6 | 6 | 7 | 7 | 8 | 8 | 9 | | | | |
| 32 | 10 | 10 | 11 | 11 | 12 | 12 | 13 | 13 | 14 | | |
| 64 | 15 | 15 | 16 | 16 | 17 | 17 | 18 | 18 | 19 | 19 | 20 |
| T | | | | | Chroma | | | | | | |
| 4 | 21 | 22 | 23 | | | | | | | | |
| 8 | 21 | 21 | 22 | 22 | 23 | | | | | | |
| 16 | 21 | 21 | 21 | 21 | 22 | 22 | 22 | | | | |
| 32 | 21 | 21 | 21 | 21 | 22 | 22 | 22 | 22 | 23 | | |

In at least one embodiment, inputs to this process can include the variable binIdx, the color component index cIdx, the binary logarithm of the transform block width log 2TbWidth and the transform block height log 2TbHeight. Output of this process is the variable ctxInc. The variable log 2TbSize is derived as follows:

If the syntax element to be parsed is last_sig_coeff_x_prefix, log 2TbSize is set equal to log 2TbWidth.

Otherwise (the syntax element to be parsed is last_sig_coeff_y_prefix), log 2TbSize is set equal to log 2TbHeight.

The variables ctxOffset and ctxShift are derived as follows:

If cIdx is equal to 0, ctxOffset is set equal to (log 2TbSize−2)*3+((log 2TbSize−1)>>2) and ctxShift is set equal to (log 2TbSize+1)>>2.

Otherwise (cIdx is greater than 0), ctxOffset is set equal to 21 and ctxShift is set equal to Clip3(0, 2, 2 log 2TbSize>>3).

The variable ctxInc is derived as follows:

ctxInc=(binIdx>>ctxShift)+ctxOffset

Figure 12:
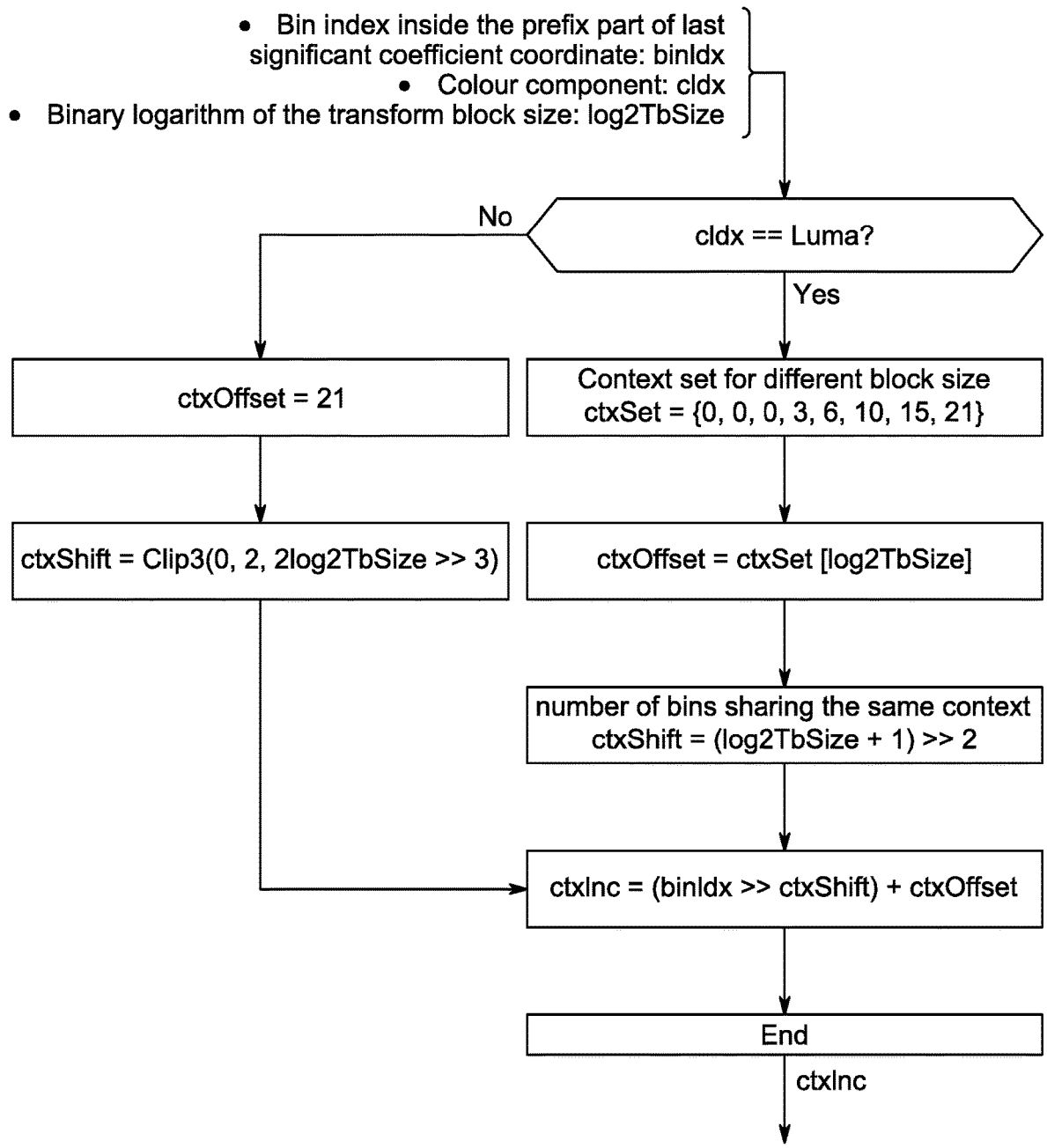

An example of an embodiment to provide the context model ctxInc derivation for last_sig_coeff_x_prefix and last_sig_coeff_y_prefix is illustrated by the flow diagram in FIG. 12.

In general, at least one example of an embodiment can provide for deriving CABAC context for syntax elements last_sig_coeff_xprefx and last_sig_coeff_y_prefix of the Luma component. As mentioned in regard to an example described above, different bins within the truncated unary part with similar statistics share contexts in order to reduce the total number of contexts. One or more embodiments can further reduce the context numbers for the syntax elements last_sig_coeff_x_prefix and last_sig_coeff_y_prefix in regard to the luma component.

In at least one embodiment, more different bin indexes for the same block size can share the same context. A variable ctxShift can be provided to decide or indicate how many bin indexes will share the same context, and the value of ctxShift is related to the block size log 2TbSize. For example, each bin index will use one context when the block width (height) equals to 4; and each 2 bin indexes will share one context when the block width (height) is larger than 4. Instead of sharing one context for each 2 bin indexes for large block sizes (i.e. when the block size equals to 64), each 3 or 4 bin indexes could share one context. Table 6 shows the modified context assignment for block size 64, luma component, with each four bin indexes sharing the same context. Six contexts for both syntax elements last_sig_coeff_x_prefix and last_sig_coeff_y_prefix can be reduced by the described embodiment.

TABLE 6 last position context index for each truncated
unary code bin of the block size 64

| Bin Index | 0 | 1 | 2 | 3 | 4 | 5 | 6 | 7 | 8 | 9 | 10 |
|---|---|---|---|---|---|---|---|---|---|---|---|
| T | | | | | Luma | | | | | | |
| 64 | 15 | 15 | 15 | 15 | 16 | 16 | 16 | 16 | 17 | 17 | 17 |

And corresponding modification of the variables ctxShift for the described embodiment can be derived as follows:

$$ctxshift = \begin{cases} (\log 2TbSize + 1) \gg 2, & \text{when } \log 2TbSize < 64 \\ 2, & \text{otherwise} \end{cases}$$

Figure 13:
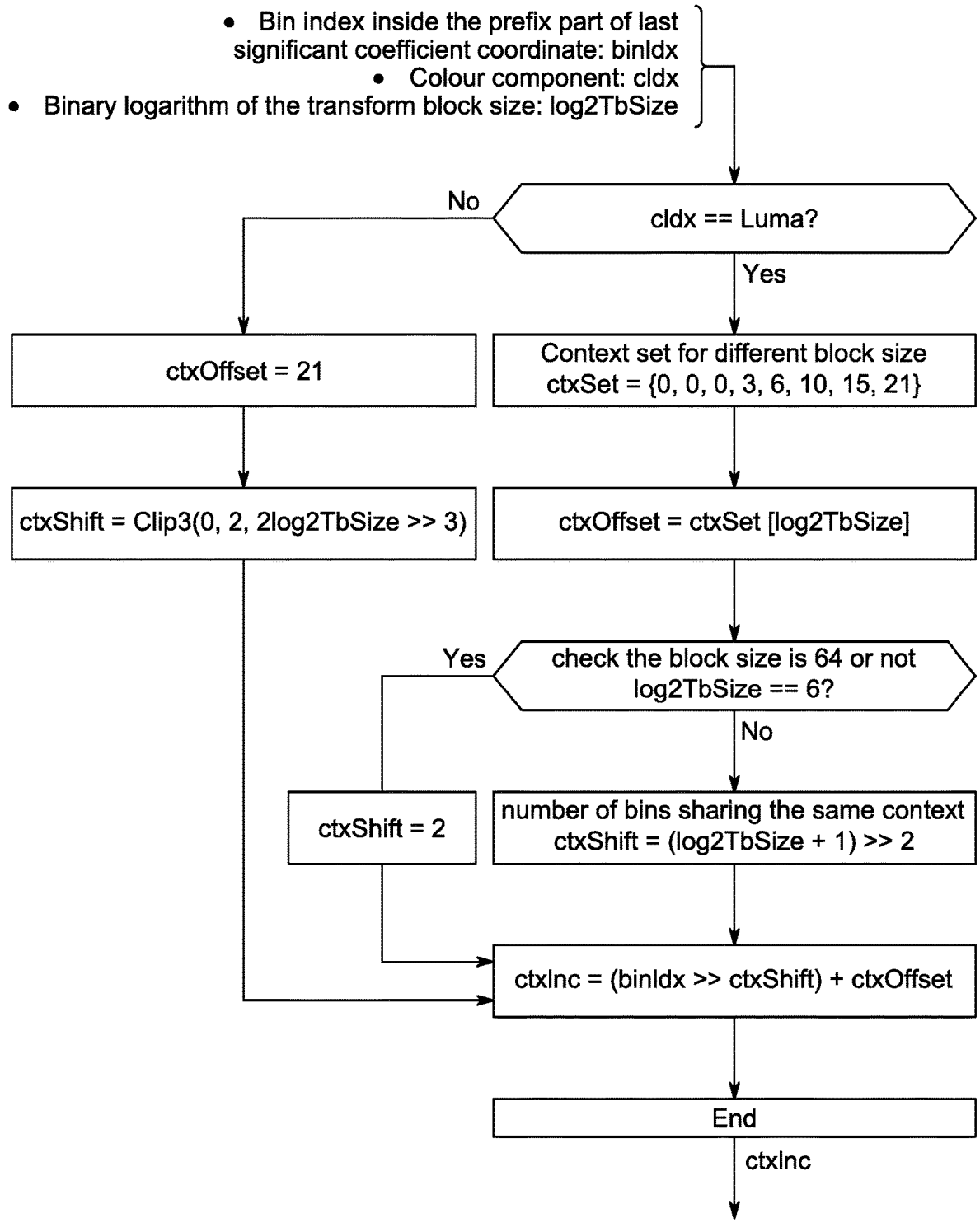

An example of an embodiment such as that described above that provides context model ctxInc derivation for last_sig_coeff_x_prefix and last_sig_coeff_y_prefix with sharing the same context for more bin indexes for block size 64 is illustrated by a flow diagram shown in FIG. 13.

In at least one variant of an embodiment such as that described above and illustrated in FIG. 13, sharing the same context among each four bin indexes can also be applied to other block sizes. In at least one other variant, sharing the same context among each x (x>2) bin indexes can also be applied to other block sizes. In at least one other variant, sharing the same context among each x (x>2) bin indexes can also be applied to other block sizes of the chroma components.

In at least one example of an embodiment, different block sizes can share the same context set. For example, in at least one system, for luma component, 3, 3, 4, 5, and 6 contexts can be used for block sizes of 4, 8, 16, 32, and 64, respectively. And the variable ctxOffset can be related to the block size log 2TbSize (ctxOffset=[0, 3, 6, 10, 15, 21]), which indicates the context set for each block size. In the present example of an embodiment, the same context could be shared for the same context set cross the different block sizes instead of assigning different context sets to different block sizes. Table 7 shows the modified context set assignment for block sizes 4 and 8, luma component, with using the same variable ctxOffset value. And the corresponding modified variable ctxOffset value set is ctxOffset=[0, 0, 3, 7, 12, 18] for this example. Six contexts for both syntax elements last_sig_coeff_x_prefix and last_sig_coeff_y_prefix can be reduced based on the described example of an embodiment.

TABLE 7 last position context index sets shared for block sizes 4 and 8

| Bin Index | 0 | 1 | 2 | 3 | 4 | 5 | 6 | 7 | 8 | 9 | 10 |
|---|---|---|---|---|---|---|---|---|---|---|---|
| T | | | | | Luma | | | | | | |
| 4 | 0 | 1 | 2 | | | | | | | | |
| 8 | 0 | 0 | 1 | 1 | 2 | | | | | | |
| 16 | 3 | 3 | 4 | 4 | 5 | 5 | 6 | | | | |
| 32 | 7 | 7 | 8 | 8 | 9 | 9 | 10 | 10 | 11 | | |
| 64 | 12 | 12 | 13 | 13 | 14 | 14 | 15 | 15 | 16 | 16 | 17 |

Figure 14:
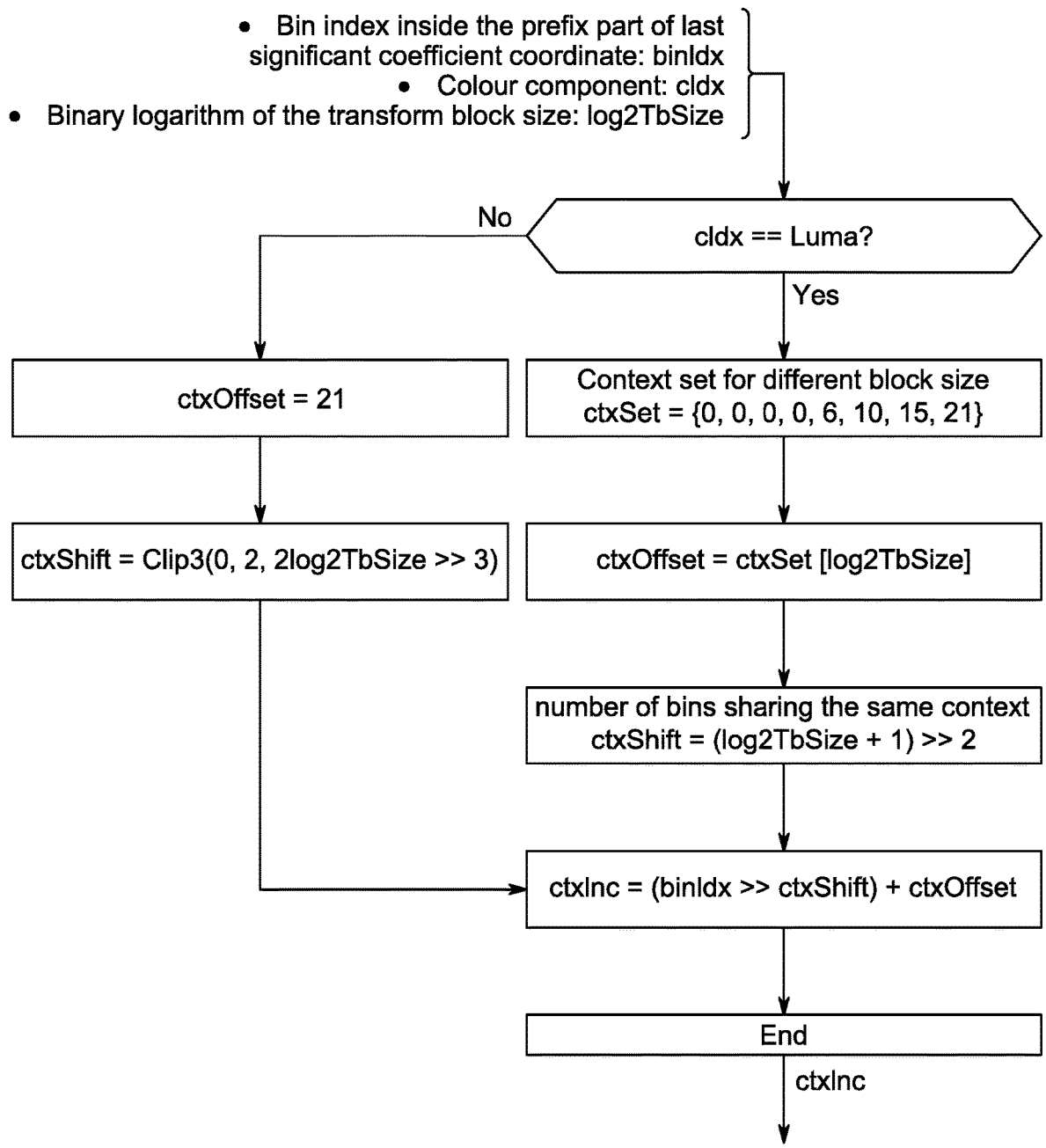

An example of an embodiment such as that described that provides context model ctxInc derivation for last_sig_coeff_x_prefix and last_sig_coeff_y_prefix with sharing the same context set for block size 4 and 8 is illustrated by a flow diagram shown in FIG. 14.

At least one variant of an embodiment such as that described above and illustrated in FIG. 14 can involve sharing the context index among all the block sizes. At least one other variant can involve sharing the context index among any of various combinations of different block sizes. At least one other variant can involve sharing the context index among luma and chroma components.

Systems in accordance with one or more embodiments described herein involving video coding and/or decoding can provide one or more of the following non-limiting examples of features individually or combined in various arrangements:

- context indexes for various syntax elements derived by the sum of left and above syntax elements can be derived by the OR value of these two neighboring elements;
- context indexes for various syntax elements derived by the sum of left and above syntax elements can be derived by the AND value of these two neighboring elements;
- context indexes for various syntax elements derived by the sum of left and above syntax elements can be derived by not using the neighboring elements;
- context indexes for signaling the coordinates of the last significant coefficient can share the same context for more different bin indexes of the same block size; and
- context indexes for signaling the coordinates of the last significant coefficient can share the same context set for different block sizes.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

In general, the examples of embodiments described and contemplated in this document can be implemented in many different forms. FIGS. 1 and 2 described above and FIG. 10 described below provide some embodiments, but other embodiments are contemplated and the discussion of FIGS. 1, 2 and 15 does not limit the breadth of the implementations. At least one embodiment generally provides an example related to video encoding and/or decoding, and at least one other embodiment generally relates to transmitting a bitstream or signal generated or encoded. These and other embodiments can be implemented as a method, an apparatus, a computer readable storage medium having stored thereon instructions for encoding or decoding video data according to any of the methods described, and/or a computer readable storage medium having stored thereon a bitstream or signal generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules of a video encoder and/or decoder such as module 145 of encoder 100 shown in FIG. 1 and module 230 of decoder 200 shown in FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example. The specific values are for example purposes and the aspects described are not limited to these specific values.

Figure 15:
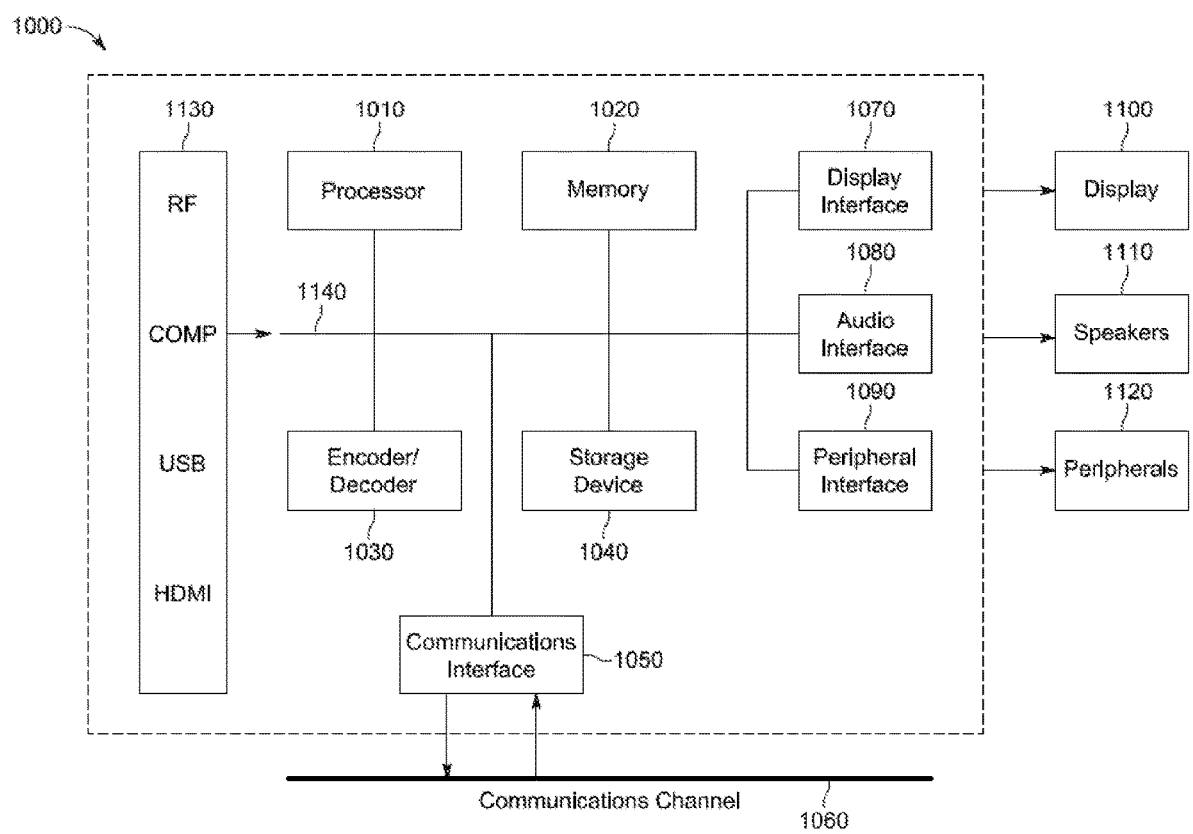
FIG. 15 provides a block diagram illustrating an example of an embodiment of apparatus in accordance with various aspects and embodiments described herein.

FIG. 15 illustrates a block diagram of an example of a system in which various aspects and embodiments can be implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Throughout this disclosure, various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining an upsample filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Also, various implementations involve encoding. In an analogous way to the above discussion about "decoding", "encoding" as used in this application can encompass all or part of the processes performed, for example, on an input video sequence in order to produce an encoded bitstream or signal. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches can be based on an extensive testing of all encoding options, including all considered modes or coding parameters values, with a complete evaluation of their coding cost and related distortion of the reconstructed signal after coding and decoding. Faster approaches can also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various generalized as well as particularized embodiments are also supported and contemplated throughout this disclosure. Examples of embodiments in accordance with the present disclosure include but are not limited to the following.

In general, at least one example of an embodiment can involve a method for encoding syntax information associated with video information comprising: identifying a coding context associated with a syntax element of a current coding unit of the video information, wherein the identifying occurs without using a syntax element of a neighboring block; and encoding the syntax element of the current coding unit based on the coding context.

In general, at least one example of an embodiment can involve a method for decoding syntax information associated with video information comprising: identifying a coding context associated with a syntax element of a current coding unit of the video information, wherein the identifying occurs without using a syntax element of a neighboring block; and decoding the syntax element of the current coding unit based on the coding context.

In general, at least one example of an embodiment can involve apparatus for encoding syntax information associated with video information comprising: one or more processors configured to identify a coding context associated with a syntax element of a current coding unit without using a syntax element of a neighboring block; and encode the syntax element of the current coding unit based on the coding context.

In general, at least one example of an embodiment can involve apparatus for decoding syntax information associated with video information comprising: one or more processors configured to identify a coding context associated with a syntax element of a current coding unit without using a syntax element of a neighboring block; and decode the syntax element of the current coding unit based on the coding context.

In general, at least one example of an embodiment can involve a method or apparatus as described herein, wherein a syntax element of a current coding unit indicates use of a video encoding mode or video decoding mode and comprises one or more of a skip mode flag, or an adaptive motion vector resolution mode flag, or a triangular prediction mode, or a current picture referencing mode, or an adaptive loop filter mode, or a partitioning mode, or an affine mode.

In general, at least one example of an embodiment can involve a method or apparatus as described herein, wherein a syntax element of a current coding unit indicates use of an adaptive motion vector resolution mode for encoding or decoding the current coding unit and the syntax element of the neighboring block indicates an adaptive motion vector resolution mode for encoding or decoding the neighboring block.

In general, at least one example of an embodiment can involve a method or apparatus as described herein, wherein encoding and/or decoding comprises entropy encoding and/or entropy decoding.

In general, at least one example of an embodiment can involve a method or apparatus as described herein, wherein entropy encoding and/or entropy decoding comprises CABAC.

In general, at least one example of an embodiment can involve a method or apparatus as described herein, wherein a neighboring block of a current coding unit comprises at least one of a neighboring block on the left of the current coding unit or a neighboring block above the current coding unit.

In general, at least one example of an embodiment can involve a method or apparatus as described herein, wherein a syntax element of a current coding unit comprises an adaptive motion vector resolution (AMVR) syntax element and identifying, or one or more processors being configured to identify, the coding context associated with the syntax element of the current coding unit is based on determining an affine mode of the current coding unit.

In general, at least one example of an embodiment can involve a method or apparatus as described herein, wherein determining an affine mode of a current coding unit is based on an inter-affine flag.

In general, at least one example of an embodiment can involve a method for encoding syntax information associated with video information comprising: identifying a coding context associated with a syntax element of a current coding unit of the video information, wherein the identifying avoids using a syntax element of a neighboring block; and encoding the syntax element of the current coding unit based on the coding context.

In general, at least one example of an embodiment can involve a method for decoding syntax information associated with video information comprising: identifying a coding context associated with a syntax element of a current coding unit of the video information, wherein the identifying avoids using a syntax element of a neighboring block; and decoding the syntax element of the current coding unit based on the coding context.

In general, at least one example of an embodiment can involve apparatus for encoding syntax information associated with video information comprising: one or more processors configured to identify a coding context associated with a syntax element of a current coding based on avoiding use of a syntax element of a neighboring block; and encode the syntax element of the current coding unit based on the coding context.

In general, at least one example of an embodiment can involve apparatus for decoding syntax information associated with video information comprising: one or more processors configured to identify a coding context associated with a syntax element of a current coding unit based on avoiding use of a syntax element of a neighboring block; and decode the syntax element of the current coding unit based on the coding context.

In general, at least one example of an embodiment can involve a method or apparatus as described herein, wherein a syntax element of a current coding unit indicates use of a video encoding mode or video decoding mode and comprises one or more of a skip mode flag, or an adaptive motion vector resolution mode flag, or a triangular prediction mode, or a current picture referencing mode, or an adaptive loop filter mode, or a partitioning mode, or an affine mode.

In general, at least one example of an embodiment can involve a method or apparatus as described herein, wherein a syntax element of a current coding unit indicates use of an adaptive motion vector resolution mode for encoding or decoding the current coding unit and the syntax element of the neighboring block indicates an adaptive motion vector resolution mode for encoding or decoding the neighboring block.

In general, at least one example of an embodiment can involve a method or apparatus as described herein, wherein encoding and/or decoding comprises entropy encoding and/or entropy decoding.

In general, at least one example of an embodiment can involve a method or apparatus as described herein, wherein entropy encoding and/or entropy decoding comprises CABAC.

In general, at least one example of an embodiment can involve a method or apparatus as described herein, wherein a neighboring block of a current coding unit comprises at least one of a neighboring block on the left of the current coding unit or a neighboring block above the current coding unit.

In general, at least one example of an embodiment can involve a method or apparatus as described herein, wherein a syntax element of a current coding unit comprises an adaptive motion vector resolution (AMVR) syntax element and identifying, or the one or more processors being configured to identify, the coding context associated with the syntax element of the current coding unit is based on determining an affine mode of the current coding unit.

In general, at least one example of an embodiment can involve a method or apparatus as described herein, wherein determining an affine mode of a current coding unit is based on an inter-affine flag.

In general, at least one example of an embodiment can involve a method for encoding syntax information associated with video information comprising: identifying a coding context associated with an adaptive motion vector resolution (AMVR) syntax element of a current coding unit of the video information without using an AMVR syntax element of a neighboring block; and encoding the AMVR syntax element of the current coding unit based on the coding context.

In general, at least one example of an embodiment can involve a method for decoding syntax information associated with video information comprising: identifying a coding context associated with an AMVR syntax element of a current coding unit of the video information without using an AMVR syntax element of a neighboring block; and decoding the AMVR syntax element of the current coding unit based on the coding context.

In general, at least one example of an embodiment can involve apparatus for encoding syntax information associated with video information comprising: one or more processors configured to identify a coding context associated with an AMVR syntax element of a current coding unit without using an AMVR syntax element of a neighboring block; and encode the AMVR syntax element of the current coding unit based on the coding context.

In general, at least one example of an embodiment can involve apparatus for decoding syntax information associated with video information comprising: one or more processors configured to identify a coding context associated with a syntax element of a current coding unit without using an AMVR syntax element of a neighboring block; and decode the AMVR syntax element of the current coding unit based on the coding context.

In general, at least one example of an embodiment can involve a method or apparatus as described herein, wherein encoding and/or decoding comprises entropy encoding and/or entropy decoding.

In general, at least one example of an embodiment can involve a method or apparatus as described herein, wherein entropy encoding and/or entropy decoding comprises CABAC.

In general, at least one example of an embodiment can involve a method or apparatus as described herein, wherein a neighboring block of a current coding unit comprises at least one of a neighboring block on the left of the current coding unit or a neighboring block above the current coding unit.

In general, at least one example of an embodiment can involve a method or apparatus as described herein, wherein identifying, or the one or more processors being configured to identify, a coding context associated with an AMVR syntax element of a current coding unit is based on determining an affine mode of the current coding unit.

In general, at least one example of an embodiment can involve a method or apparatus as described herein, wherein determining an affine mode of a current coding unit is based on an inter-affine flag.

In general, at least one example of an embodiment can involve a computer program product including instructions, which, when executed by a computer, cause the computer to carry out a method in accordance with one or more examples of embodiments described herein.

In general, at least one example of an embodiment can involve a non-transitory computer readable medium storing executable program instructions to cause a computer executing the instructions to perform a method in accordance with one or more examples of embodiments described herein.

In general, at least one example of an embodiment can involve a signal comprising data generated according to any one or more examples of embodiments described herein.

In general, at least one example of an embodiment can involve a bitstream, formatted to include syntax elements and encoded image information generated in accordance with any one or more of the examples of embodiments described herein.

In general, at least one example of an embodiment can involve a device comprising: an apparatus in accordance with any one or more of the examples of embodiments described herein; and at least one of (i) an antenna configured to receive a signal, the signal including data representative of the image information, (ii) a band limiter configured to limit the received signal to a band of frequencies that includes the data representative of the image information, and (iii) a display configured to display an image from the image information.

In general, at least one example of an embodiment can involve a device as described herein, wherein the device comprises one of a television, a television signal receiver, a set-top box, a gateway device, a mobile device, a cell phone, a tablet, or other electronic device.

Various examples of embodiments have been described. These and other embodiments in accordance with the present disclosure may include any of the following features or entities, alone or in any combination, across various different claim categories and types:

Providing in an encoder and/or decoder for applying a form of entropy coding based on information provided by at least one syntax element, and deriving a number of contexts for the at least one syntax element, wherein the deriving comprises reducing the number of contexts.

Providing in an encoder and/or decoder for applying a form of entropy coding based on information provided by at least one syntax element, and deriving a number of contexts for the at least one syntax element, wherein the deriving comprises reducing the number of contexts, and wherein the reducing is based on using left and above syntax elements.

Providing in an encoder and/or decoder for applying a form of entropy coding based on information provided by at least one syntax element, and deriving a number of contexts for the at least one syntax element, wherein the deriving comprises reducing the number of contexts, and wherein the reducing is based on using left and above neighboring syntax elements.

Providing in an encoder and/or decoder for applying a form of entropy coding based on information provided by at least one syntax element, and deriving a number of contexts for the at least one syntax element, wherein the deriving comprises reducing the number of contexts, and wherein the reducing is based on sharing the same context for different bin indexes of the same block size.

Providing in an encoder and/or decoder for applying a form of entropy coding based on information provided by at least one syntax element, and deriving a number of contexts for the at least one syntax element, wherein the deriving comprises reducing the number of contexts, and wherein the reducing is based on sharing the same context index set for different block sizes when signaling the coordinates of the last significant coefficient.

Providing in an encoder and/or decoder for applying a form of entropy coding based on information provided by at least one syntax element, and deriving a number of contexts for the at least one syntax element, wherein the deriving comprises reducing the number of contexts, and wherein the reducing is based on a sum of left and above syntax elements, and wherein the sum of left and above syntax elements can be derived based on the OR value of left and above neighboring elements or based on the AND value of left and above neighboring elements.

Providing in an encoder and/or decoder for applying a form of entropy coding based on information provided by at least one syntax element, and deriving a number of contexts for the at least one syntax element, wherein the deriving comprises reducing the number of contexts, and wherein the reducing is based on a sum of left and above syntax elements, and wherein the sum of left and above syntax elements can be derived based on not using the neighboring elements.

Providing in an encoder and/or decoder for applying a form of entropy coding in accordance with any of the embodiments, features or entities, alone or in any combination, as described herein, wherein the form of entropy encoding comprises CABAC.

Providing in an encoder and/or decoder for applying a form of entropy coding in accordance with any of the embodiments, features or entities, alone or in any combination, as described herein based on providing reduced complexity and/or improved compression efficiency.

Inserting in the signaling syntax elements that enable the encoder and/or decoder to provide encoding and/or decoding in accordance with any of the embodiments, features or entities, alone or in any combination, as described herein.

Selecting, based on these syntax elements, the features or entities, alone or in any combination, as described herein to apply at the decoder.

A bitstream or signal that includes one or more of the described syntax elements, or variations thereof.

Inserting in the signaling syntax elements that enable the decoder to provide decoding in a manner corresponding to the manner of encoding used by an encoder.

Creating and/or transmitting and/or receiving and/or decoding a bitstream or signal that includes one or more of the described syntax elements, or variations thereof.

A TV, set-top box, cell phone, tablet, or other electronic device that provides for applying encoding and/or decoding according to any of the embodiments, features or entities, alone or in any combination, as described herein.

A TV, set-top box, cell phone, tablet, or other electronic device that performs encoding and/or decoding according to any of the embodiments, features or entities, alone or in any combination, as described herein, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs encoding and/or decoding according to any of the embodiments, features or entities, alone or in any combination, as described herein.

A TV, set-top box, cell phone, tablet, or other electronic device that receives (e.g. using an antenna) a signal over the air that includes an encoded image, and performs encoding and/or decoding according to any of the embodiments, features or entities, alone or in any combination, as described herein.

A computer program product storing program code that, when executed by a computer encoding and/or decoding in accordance with any of the embodiments, features or entities, alone or in any combination, as described herein.

A non-transitory computer readable medium including executable program instructions causing a computer executing the instructions to implement encoding and/or decoding in accordance with any of the embodiments, features or entities, alone or in any combination, as described herein.

Various other generalized, as well as particularized embodiments are also supported and contemplated throughout this disclosure.

The invention claimed is:

1. A method for encoding syntax information associated with video information comprising:
selecting a coding context associated with a syntax element of a current coding unit of the video information, wherein the coding context is selected among two coding contexts and the selecting occurs without using a syntax element of a neighboring block; and
encoding the syntax element of the current coding unit based on the coding context, wherein the syntax element of the current coding unit indicates use of a video encoding mode and comprises an adaptive motion vector resolution mode syntax.

2. A method for decoding syntax information associated with video information comprising:
selecting a coding context associated with a syntax element of a current coding unit of the video information, wherein the coding context is selected among two coding contexts and the selecting occurs without using a syntax element of a neighboring block; and
decoding the syntax element of the current coding unit based on the coding context wherein the syntax element of the current coding unit indicates use of a video encoding mode or video decoding mode and comprises an adaptive motion vector resolution mode syntax.

3. An apparatus for encoding syntax information associated with video information comprising:
one or more processors configured to:
select a coding context associated with a syntax element of a current coding unit without using a syntax element of a neighboring block, wherein the coding context is selected among two coding contexts; and
encode the syntax element of the current coding unit based on the coding context wherein the syntax element of the current coding unit indicates use of a video encoding mode and comprises an adaptive motion vector resolution mode syntax.

4. An apparatus for decoding syntax information associated with video information comprising:
one or more processors configured to:
select a coding context associated with a syntax element of a current coding unit without using a syntax element of a neighboring block, wherein the coding context is selected among two coding contexts; and
decode the syntax element of the current coding unit based on the coding context wherein the syntax element of the current coding unit indicates use of a video decoding mode and comprises an adaptive motion vector resolution mode syntax.

5. The method of claim 2, wherein the syntax element of the current coding unit further comprises one or more of a skip mode flag, an adaptive motion vector resolution mode flag, a triangular prediction mode, a current picture referencing mode, an adaptive loop filter mode, a partitioning mode, or an affine mode.

6. The method of claim 2, wherein the encoding and/or decoding comprises entropy encoding and/or entropy decoding.

7. The method of claim 6, wherein the entropy encoding and/or entropy decoding comprises CABAC.

8. The method of claim 2, wherein the neighboring block comprises at least one of a neighboring block on the left of the current coding unit or a neighboring block above the current coding unit.

9. The method of claim 2, wherein the syntax element of the current coding unit comprises an adaptive motion vector resolution (AMVR) syntax element and the selecting of the coding context associated with the syntax element of the current coding unit is based on determining an affine mode of the current coding unit.

10. The method of claim 9, wherein determining the affine mode of the current coding unit is based on an inter-affine flag.

11. A non-transitory computer readable medium storing executable program instructions to cause a computer executing the instructions to perform a method according to claim 2.

12. A non-transitory computer readable medium storing data generated according to the method of claim 1 and representing a bitstream, formatted to include syntax elements and encoded image information.

13. The apparatus of claim 4, further comprising:
   at least one of (i) an antenna configured to receive a signal, the signal including data representative of the image information, (ii) a band limiter configured to limit the received signal to a band of frequencies that includes the data representative of the image information, and (iii) a display configured to display an image from the image information.

14. The apparatus of claim 13, wherein the apparatus comprises one of a television, a television signal receiver, a set-top box, a gateway device, a mobile device, a cell phone, a tablet, or other electronic device.

15. The apparatus of claim 4, wherein the syntax element of the current coding unit further comprises one or more of a skip mode flag, an adaptive motion vector resolution mode flag, a triangular prediction mode, a current picture referencing mode, an adaptive loop filter mode, a partitioning mode, or an affine mode.

16. The apparatus of claim 4, wherein the one or more processors being configured to decode the syntax element comprises the one or more processors being configured to perform entropy decoding of the syntax element.

17. The apparatus of claim 16, wherein the entropy decoding comprises CABAC.

18. The apparatus of claim 4, wherein the neighboring block comprises at least one of a neighboring block on the left of the current coding unit or a neighboring block above the current coding unit.

19. The apparatus of claim 4, wherein the syntax element of the current coding unit comprises an adaptive motion vector resolution (AMVR) syntax element and the one or more processors are configured to select the coding context associated with the syntax element of the current coding unit based on determining an affine mode of the current coding unit.

20. The apparatus of claim 19, wherein determining the affine mode of the current coding unit is based on an inter-affine flag.

* * * * *